United States Patent Office 3,639,488
Patented Feb. 1, 1972

---

3,639,488
PREPARATION OF NITRO-HEXAFLUORO-CUMINOLS
Stephen Joseph Kuhn, Sarnia, Ontario, Canada, assignor to The Dow Chemical Company, Midland, Mich.
No Drawing. Filed May 8, 1968, Ser. No. 727,736
Int. Cl. C07c 31/14
U.S. Cl. 260—618 D
7 Claims

ABSTRACT OF THE DISCLOSURE

New nitro-hexafluorocuminols are produced in the exclusive meta-nitration of the $\alpha,\alpha$-bis(trifluoro methyl) benzyl alcohols by a mixture of fuming nitric and concentrated sulfuric acids at temperatures of 0–50° C. The nitrated compounds are useful as strong acids and bactericides.

BACKGROUND OF THE INVENTION

This invention pertains to the nitration of the $\alpha,\alpha$-bis(trifluoromethyl)benzyl alcohols and the products thereof. The above alcohols are prepared according to the method taught by (1) B. S. Farah et al., J. Org. Chem., 30, 998 (1965) and (2) I. L. Knunyants et al., Izv. Akad. Nauk SSSR, Otd. Khim. Nauk 1962, 684–92 (C.A. 57: 12305 i).

SUMMARY OF THE INVENTION

It has now been discovered that exclusive meta-nitration of the substituted and unsubstituted $\alpha,\alpha$-bis(trifluoromethyl)benzyl alcohols, hereinafter the hexafluorocuminols, occurs in the reaction between the said benzyl alcohols and: (1) a mixture of fuming nitric and concentrated sulfuric acids or (2) nitronium tetrafluoroborate. The products thus prepared are new compounds and are obtained in high yield and purity.

The products have the general formula

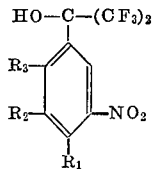

wherein $R_1$ and $R_2$ are each independently hydrogen, halogen, alkyl of 1–10 carbon atoms or

wherein A is hydrogen or alkyl of 1–4 carbon atoms and $R_3$ is hydrogen, halogen, methyl or ethyl, and wherein either $R_2$ or $R_3$ is hydrogen and wherein not more than one of $R_1$ and $R_2$ is

and are prepared by nitrating the corresponding hexafluorocuminol.

The preferred compounds are those wherein $R_2$ and $R_3$ are each hydrogen and $R_1$ is fluoro, chloro, bromo or alkyl of 1–5 carbon atoms.

The hexafluorocuminols to be nitrated are prepared by reacting the corresponding aromatic compound and hexafluoroacetone in the presence of a Lewis acid catalyst, according to the method taught by B. S. Farah et al., J. Org. Chem., 30, 998 (1965).

The preferred general procedure for preparing the nitrated hexafluorocuminols comprises the addition of the hexafluorocuminol to a mixture of fuming nitric acid and concentrated sulfuric acid while the temperature is maintained between 0–50° C. After the addition of hexafluorocuminol is complete, the temperature of the stirred mixture is adjusted to about 25° C. or slightly above and poured over ice. The product is separated and washed with cold water.

The nitration reactions are suitably carried out at temperatures between 0–50° C. and preferably between 10–30° C. At lower temperatures the reaction rate decreases and stirring becomes quite difficult due to increased viscosity. Temperatures above about 30° C. may lead to explosive products and undesirable by-products, such as the nitric acid esters of the benzyl alcohols. The temperature of the reaction is generally raised after the addition of the hexafluorocuminols to about 50° to insure complete reaction.

Any molar ratio of fuming nitric acid, concentrated sulfuric acid, and hexafluorocuminol may be used as long as there is at least an equimolar amount of nitric acid and hexafluorocuminol. Suitably a mixture of 1–5 moles of concentrated sulfuric acid and 1–3 moles of fuming nitric acid are used for each mole of substance to be nitrated, and preferably 2.5–3.5 moles of concentrated sulfuric acid and 1.5–2.5 moles of fuming nitric acid are used per mole of hexafluorocuminol. Nitronium tetrafluoroborate used in solution and in equimolar proportions to the hexafluorocuminol at 0–50° C. is likewise an effective nitrating agent.

The compounds of the invention are useful as bactericides.

SPECIFIC EMBODIMENT

The following examples are used to further illustrate the invention.

EXAMPLE 1

Preparation of m-nitrohexafluorocuminol

Hexafluorocuminol ($\alpha,\alpha$ - bis(trifluoromethyl)benzyl alcohol), 96.8 g. (0.4 mole), was added dropwise to a mixture of 72 g. of fuming nitric acid and 120 g. of concentrated sulfuric acid (96%) while the temperature of the reaction mixture was kept between 20–30° C. by means of a cold water bath. The reaction mixture was vigorously agitated during the addition (30–40 min.). After the addition of all the hexafluorocuminol, the mixture was slowly heated to 50° C. After cooling to about room temperature, the reaction mixture was poured into 1 kg. of ice-water with stirring. The solid product was filtered out and washed five times with cold water. After drying the product was recrystallized from hexane containing 10% of benzene. Nearly white crystals were obtained; M.P. 118–121° C.; 98% yield.

EXAMPLE 2

Preparation of p-methyl-m-nitrohexafluorocuminol p-Methyl-hexafluorocuminol, 32.6 g. (0.126 mole), was added to an acid mixture consisting of 22 g. of fuming nitric acid and 36 g. of concentrated sulfuric acid. Nitration was carried out under similar reaction conditions as in Example 1 except the reaction temperature was maintained at about 15–20° C. An oily liquid separated from the reaction mixture and was poured into 250 g. of ice-water. The oily liquid was extracted with 100 ml. of $CHCl_3$ and the $CHCl_3$ solution was washed three times with cold water and dried over $MgSO_4$. The chloroform was removed and the pale yellow product purified by distillation. B.P. 112–115° C./2 mm.; M.P. 63–65° C.; 90.5% yield.

EXAMPLE 3

Preparation of m-nitrohexafluorocuminol 0.03 mole of $NO_2BF_4$ was dissolved in 100 g. of tetramethylene sulfone, $(CH_2)_4SO_2$, and added dropwise to a solution of 25 g. tetramethylene sulfone and 0.025 mole of hexafluorocuminol. The reaction temperature was maintained at about 25° C. After the reaction was completed, the reaction mixture was poured into 500 g. of ice-water. The product was extracted from this aqueous mixture with CHCl₃, the CHCl₃ solution was dried over MgSO₄, the CHCl₃ was stripped off and the product purified by recrystallization. The purified product had the same properties as the compound of Example 1. Product yield was about 80%.

Other compounds of the general formula

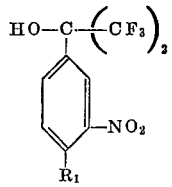

were prepared in substantially the procedure illustrated in Examples 1 and 2 and are tabulated in Table I.

TABLE I

| Compound | B.P., ° C. | M.P., ° C. | Percent yield |
| --- | --- | --- | --- |
| R₁=ethyl | 122–123/3 mm | 53–55 | 85 |
| R₁=n-propyl | 122–124/2 mm | | 81 |
| R₁=fluoro | 104/2.1 mm | 60–63 | 92.5 |
| R₁=chloro | | 70–72 | 93 |
| R₁=bromo | | 76–78 | 97.7 |

Similarly, using the procedure illustrated in the above examples, compounds such as 2-fluoro-4-n-butyl-R, 2-bromo-4-cyclohexyl-R, 2-chloro-4-n-octyl-R, 2,4-dichloro-R, 2,4-dimethyl-R, 2,4-diethyl-R, 2-methyl-4-chloro-R, 2-methyl-4-n-butyl-R, 2-methyl-4-n-octyl-R, 2-ethyl-4-fluoro-R, 2-ethyl-4-cyclohexyl-R, 3,4-dimethyl-R, 3,4-dichloro-R, 3-cyclohexyl-R, 3-n-propyl-4-fluoro-R, 3-bromo-4-n-hexyl-R, 3-fluoro-R and 4-n-hexyl-R are obtained wherein R is -5-nitrohexafluorocuminol. They have biological activity similar to the above examples.

ILLUSTRATED UTILITY (A) m-Nitrohexafluorocuminol or p-chloro-m-nitrohexafluorocuminol at 500 parts per million (p.p.m.) in a nutrient agar medium and as the sole toxicant therein inhibits growth or kills *Bacillus subtilis, Staphylococcus aureus, Aspergillus terreus, Candida pelliculosa,* and many others.

(B) p-Ethyl-m-nitrohexafluorocuminol at 100 p.p.m. in a nutrient agar medium and as the sole toxicant therein inhibits growth or kills the organisms listed in (A) above.

All of the above microbial tests were compared to a control standard wherein the nutrient agar medium contained no inhibitor. In every instance the organisms flourished on the control medium.

I claim:

1. A compound of the formula

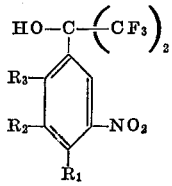

wherein R₁ and R₂ are each independently hydrogen, halogen, alkyl of 1–10 carbon atoms or

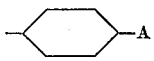

wherein A is hydrogen or alkyl of 1–4 carbon atoms and R₃ is hydrogen, halogen, methyl or ethyl and wherein either R₂ or R₃ is hydrogen and wherein not more than one of R₁ and R₂ is

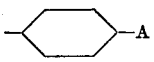

2. The compound of claim 1 wherein R₁ and R₂ are each independently hydrogen, fluoro, chloro, bromo or alkyl of 1–5 carbon atoms and R₃ is hydrogen, fluoro, chloro, bromo, methyl or ethyl.

3. The compound of claim 2 wherein R₂ and R₃ are each hydrogen.

4. The compound of claim 3 wherein R₁ is alkyl of 1–5 carbon atoms.

5. The compound of claim 3 wherein R₁ is fluoro, chloro or bromo.

6. The process of preparing the compound of claim 1 comprising reacting by contacting a compound of the formula

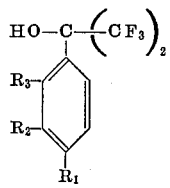

wherein R₁ and R₂ are each independently hydrogen, halogen, alkyl of 1–10 carbon atoms or

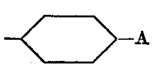

wherein A is hydrogen or alkyl of 1–4 carbon atoms and R₃ is hydrogen, halogen, methyl or ethyl and wherein either R₂ or R₃ is hydrogen and wherein not more than one of R₁ and R₂ is

with a mixture of concentrated sulfuric acid and fuming nitric acid, said acid mixture comprising 2.5–3.5 moles of concentrated sulfuric acid and 1.5–2.5 moles of fuming nitric acid per mole of substance to be nitrated and wherein the reaction temperature is 10–30° C.

7. The process defined in claim 7 wherein R₂ and R₃ are each hydrogen and R₁ is hydrogen, fluoro, chloro, bromo or alkyl of 1–5 carbon atoms.

References Cited

UNITED STATES PATENTS 3,355,500  11/1967  Farah et al. _____ 260—613
3,444,244  5/1969   Newallis et al. _____ 260—613

BERNARD HELFIN, Primary Examiner

U.S. Cl. X.R.

260—999

PO-1050
(5/69)

UNITED STATES PATENT OFFICE
CERTIFICATE OF CORRECTION

Patent No. 3,639,488      Dated 1 February 1972

Inventor(s) Stephen Joseph Kuhn

It is certified that error appears in the above-identified patent and that said Letters Patent are hereby corrected as shown below:

Column 4, line 54, change "claim 7 wherein" to --claim 6 wherein--.

Signed and sealed this 22nd day of August 1972.

(SEAL)
Attest:

EDWARD M. FLETCHER, JR.      ROBERT GOTTSCHALK
Attesting Officer      Commissioner of Patents